July 24, 1923.
C. A. CHAMPLIN
ANIMAL TRAP
Filed March 20, 1922
1,462,739
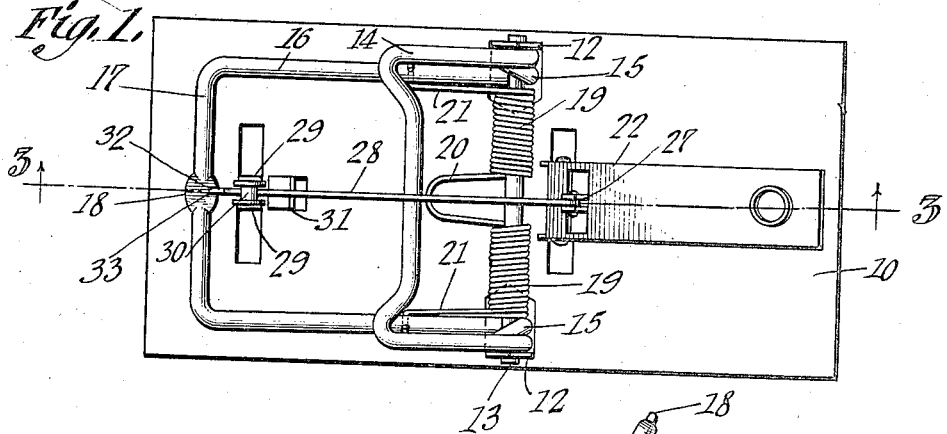
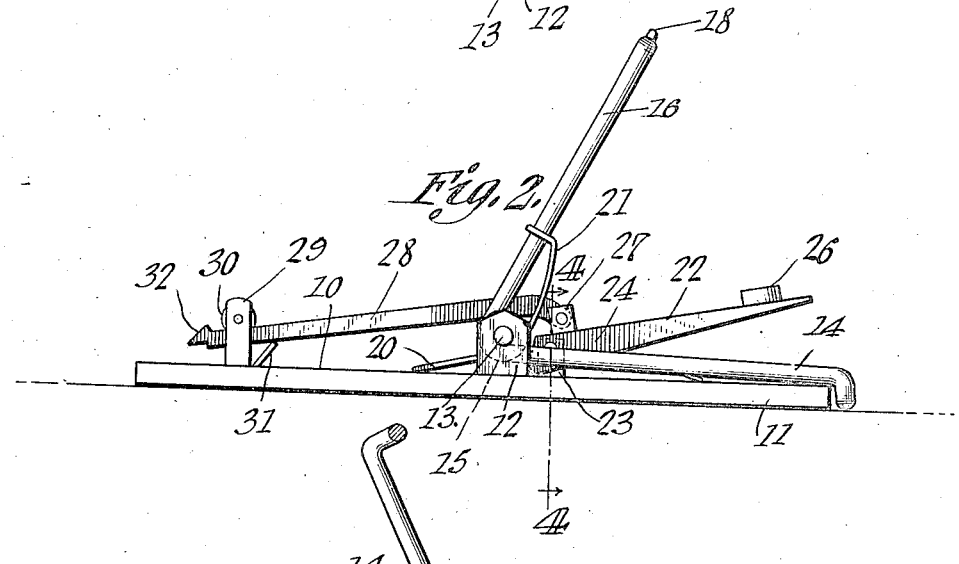
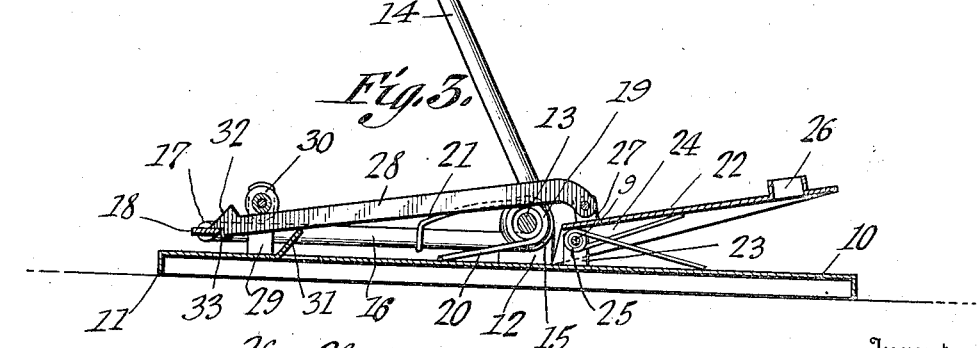
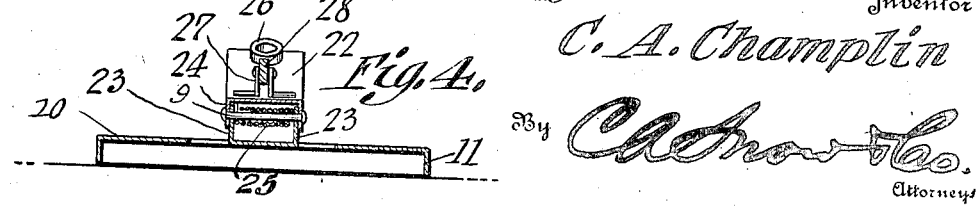
Inventor
C. A. Champlin
By
Attorneys Patented July 24, 1923.

1,462,739

UNITED STATES PATENT OFFICE.

CHARLES A. CHAMPLIN, OF HOPE, ARKANSAS, ASSIGNOR OF THIRTY-FIVE PER CENT TO RICHARD E. RUTLEDGE, OF HOPE, ARKANSAS.

ANIMAL TRAP.

Application filed March 20, 1922. Serial No. 545,166.

*To all whom it may concern:*

Be it known that I, CHARLES A. CHAMPLIN, a citizen of the United States, residing at Hope, in the county of Hempstead and State of Arkansas, have invented a new and useful Animal Trap, of which the following is a specification.

This invention relates to animal traps and more especially to rat and mouse traps.

An object of this invention is to provide an animal trap which is spring actuated and having its components arranged so as to permit free movement of the trigger member while the spring actuated member is in its set position.

Another object of the invention is to provide a spring actuated animal trap having automatic latch or trigger instrumentalities to readily cooperate with the spring actuated member thereby providing a device that may be readily set without danger of injuring the user.

A further object of this invention, is to provide a spring actuated animal trap of generally improved construction, whereby the device will be simple, durable, and inexpensive in construction, as well as convenient practical serviceable and efficient in its use.

The invention has been illustrated in the accompanying drawings in its preferred embodiment, wherein:

Figure 1 is a top plan view of the trap in its set position.

Figure 2 is a side elevation of the trap with the jaw in its closed or normal position.

Figure 3 is a longitudinal vertical section taken on a line 3—3 of Figure 1, and showing the jaw in its set position, and Figure 4 is a transverse sectional view taken on a line 4—4 of Figure 2.

Referring to the drawings, there is shown a base 10 which is preferably formed of sheet metal and having down turned marginal flanges 11. Opposed ears or bearing members 12 are formed by cutting away portions of the base 10 and bending them upwardly to a vertical position, and these bearing members receive a transverse rod or shaft 13, which extend through apertures formed therein and this rod is suitably secured thereto.

A spring actuated member is provided and comprises a U-shaped jaw 14 having eyes 15 formed at its terminals, these eyes encircling the shaft 13 thereby providing a fulcrum for the jaw 14. Formed integral with the eyes 15 and jaw 14 is a U-shaped arm 16 which is disposed at an acute angle to the jaw 14, and the intermediate or transversely extending portion 17 is flattened, as shown at 18, for reasons which will be hereinafter disclosed. The jaw 14, is normally urged towards the base 10 under the influence of a heilical torsion spring which comprises opposed coils 19 which are mounted upon the rod 13 and are united by an intermediate U-shaped finger 20 and the opposed terminals of the spring are formed into fingers 21 which engage the arm 16.

A trigger 22 is fulcrumed to ears 23 upstanding from the base 10 by means of a transverse pin 9 which extends through the ears 23 and flanges 24 extending inwardly from the trigger 22. The convolutions of a torsion spring 25 surround the pin 9, one terminal of the spring 25 is formed into a finger which engages the base 10 and another finger extends from the opposed terminal of this spring and engages the trigger 22. That terminal of the trigger 22 which is remote from its pivotal connection with the base 10 is provided with a bait receiving receptacle 26 which is formed by upstriking an annular flange from the trigger 22. Attaching ears 27 are formed on the trigger 22 at a point intermediate its terminals and located adjacent the fulcrum of the trigger, and a link or latch member 28 is pivotally secured to the ears 27. The opposed terminal of the latch member 28 extends between guide posts 29 which have a roller 30 journalled therebetween and adapted to engage an edge of this latch member, and a bearing strip or member 31 is upstruck from the base 10 and engages that edge of the latch 28 which is remote from the roller 30, thereby forming a guide for the latch member. The latch member has an inclined edge or cam 32 formed at this terminal which is adapted to co-operate with the flattened portion 18 of the arm 16 as will be hereinafter disclosed.

In operation the trap is readily set by grasping the intermediate portion 17 of the arm 16 and moving it towards the base 10 until the flattened portion 18 engages the inclined edge 32 of the latch 28. Further movement of the arm 16 towards the base will force the latch member 28 towards the trigger thereby allowing the flattened portion 18 to snap under the outer terminal of the latch member 28 as shown at 33, and the latch member is held in this position by means of the torsion spring 25. Now the trap is set and the slightest pressure on the trigger will cause the torsion spring 25 to yield, thereby permitting the trigger to move the latch member from engagement with the flattened portion 18 of the arm 16 thus releasing the jaw 14, and this releasing movement is facilitated by the roller 30 which receives the stress exerted by the main torsion spring 19 when the trap is in its set position, thereby presenting a highly sensitive but positively safe trap.

Having thus described my invention, what is claimed is:—

1. An animal trap including a base, a trigger, a spring actuated jaw cooperating with and normally urged towards the base, an arm extending from the jaw and disposed at an angle thereto, a latch member mounted for longitudinal sliding movement upon the base and operably connected to the trigger, means for guiding and holding the latch member in its longitudinal movement, and a cam surface formed at that end of the latch member which is remote from the trigger to operably engage the said arm to move the trigger into position to engage and hold the arm against the tension of the jaw spring, thereby holding the said jaw in its set position.

2. An animal trap including a base, a trigger fulcrumed upon the base, a spring actuated jaw pivotally secured to the base and normally urged toward the base, an arm extending from the jaw and disposed at an angle thereto, a latch member having one terminal pivotally secured to the trigger and mounted for longitudinal sliding movement upon the base, and means carried at that end of the latch member which is remote from the trigger for operably engaging the arm and moving the latch member into position to engage and hold the arm against the tension of spring which urges the jaw towards the base.

In testimony that I claim the foregoing as my own, I have hereto affixed my signature in the presence of a witness.

CHARLES A. CHAMPLIN.

Witness:
G. D. MORROW.